March 1, 1949.  J. ROBINSON  2,463,314

POWER TRANSMISSION

Filed Nov. 15, 1945

INVENTOR.
JAMES ROBINSON
BY
Ralph L. Tweedale
ATTORNEY

Patented Mar. 1, 1949

2,463,314

UNITED STATES PATENT OFFICE 2,463,314

POWER TRANSMISSION

James Robinson, Huntington Woods, Mich., assignor to Vickers Incorporated, Detroit, Mich., a corporation of Michigan Application November 15, 1945, Serial No. 628,933

8 Claims. (Cl. 103—162)

This invention relates to power transmissions, particularly to those of the type comprising two or more fluid pressure energy translating devices, one of which may function as a pump and another as a fluid motor.

The invention is more particularly concerned with a fluid pressure energy translating device of the variable displacement multiple axial cylinder type. In one widely used type of axial cylinder device the rotating cylinder barrel is carried in a swinging yoke which contains the distributing valve for the cylinder bores and the inlet and outlet ports of the device. The yoke is generally U-shaped and the side arms thereof are provided with hollow passages leading to the trunnions on which the yoke pivots, and the external connections to the device are made through the trunnions.

It is an object of the present invention to eliminate the hollow pasages in the side arms of the yoke and the trunnion thereof, and to substitute therefor a hollow telescoping and pivoting connection directly from the valve plate to a stationary point on the housing.

It is also an object of the present invention to provide a pump of this class wherein the hollow telescoping connection performs the additional function of regulating the displacement of the pump in response to the delivery pressure thereof.

Further objects and advantages of the present invention will be apparent from the following description, reference being had to the accompanying drawing wherein a preferred form of the present invention is clearly shown.

Figure 1:
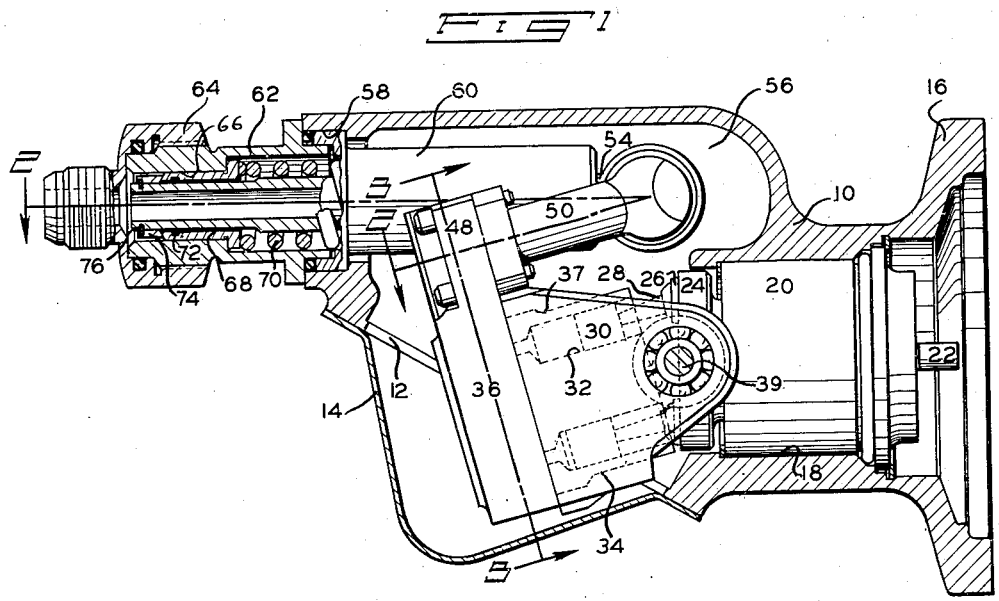
Figure 1 is a longitudinal sectional view of a pump incorporating a preferred form of the present invention.
Figure 3:
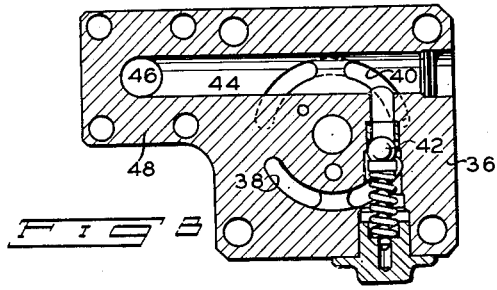
Figure 3 is a cross-section on line 3—3 of Figure 1.

Referring now to Figure 1, there is provided a main housing 10 having an access opening 12 closed by a cover plate 14. The housing has a mounting flange 16 and a stepped bore 18 in which is mounted an assembly 20 comprising the usual bearing retainer, bearing, and the drive shaft 22 of the pump. The drive shaft 22 carries a driving flange 24 which carries the connecting rod sockets 26 having connecting rods 28 articulated thereto and carrying pistons 30 articulated by means of ball joints at their opposite ends. The pistons 30 reciprocate in cylinder bores 32 formed in the cylinder barrel 34 which is driven from the shaft 22 by a universal joint connection not shown. The cylinder barrel 34 rotates against the face of a valve plate 36 having arcuate inlet and outlet ports 38 and 40, see Figure 3. The valve plate has an internal relief valve 42 opening from the delivery port 40 to the inlet port 38 whenever a predetermined pressure is exceeded. The valve plate 36 is mounted on yoke arms 37 which are pivoted on trunnions 39 fitted with ball bearings.

The inlet port 38 extends completely through to the lefthand face of valve plate 36, Figure 1, so as to take in oil from the interior of housing 10. The delivery port 40, however, does not extend completely through the valve plate but intersects a transverse passage 44 extending to the left of the valve plate, in Figure 3, where it connects with a perpendicular passage 46, formed in the valve plate extension 48. Bolted to the extension 48 is a tubular extension 50 having a hollow pintle 52 extending at right angles therefrom. Journaled on the pintle 52 is a piston rod 54.

Figure 2:
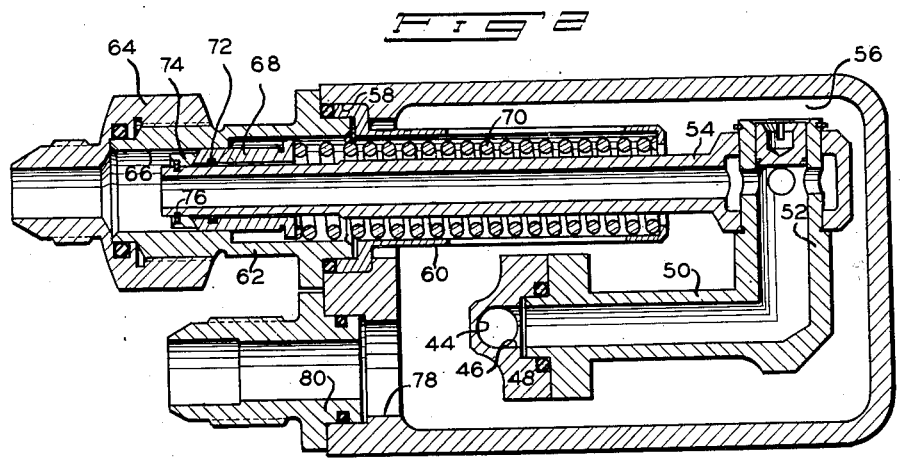
Figure 2 is a cross-section on line 2—2 of Figure 1.

Housing 10 has an outwardly extending chamber 56 at the top of Figure 1 which terminates in a stepped bore 58. Mounted in the bore 58 are a spring retaining sleeve 60 and a cylinder member 62. The latter has a connection fitting 64 screwed on its outer end. The cylinder member 62 is provided with a cylinder bore 66 in which a piston 68 is slidably mounted, see Figure 2. The piston 68 has its righthand end bearing against a spring 70 contained in the spring retainer 60. The hollow rod 54 extends through the piston 68 with substantial clearance, a sealing ring 72 being provided near the lefthand end of the piston 68.

The left end of piston 68 is formed with a spherical contour, and a retainer sleeve 74, having a mating contour, abuts against the same and is held in place on the hollow rod 54 by a split ring 76. Chamber 56 of the housing 10 is also provided with a second stepped bore 78 in which is mounted a connection fitting 80 serving as the inlet connection to the pump.

In operation, it will be seen that, when the drive shaft 22 is rotated, top toward the observer when viewed in Figure 1, pistons 30 as they pass across the discharge port 40 will deliver the contents of cylinder bores 32 into that port, and, as they pass across the inlet port 38, will draw in oil through that port. The oil from delivery port 40 passes through passage 44, bore 46, tube 50, pintle 52 and hollow rod 54 to the cylinder bore 66 and out through the connection fitting 64, When the pressure in the delivery line is low, the parts assume the position illustrated in Figure 1 since the spring 70 maintains the piston 68 fully projected to the left into cylinder bore 66. When the delivery pressure reaches a predetermined value determined by the force of spring 70 and the area of cylinder bore 66, the piston 68 will start to move back, carrying with it the yoke 37 causing it to swing on its trunnions 39 to reduce the stroke of pistons 30. This action continues until the delivery of the pump is reduced to the point where pressure no longer builds up. Conversely, on a reduction in pressure in the delivery line, the spring 70 overcomes the fluid pressure in cylinder bore 66, increasing the displacement of the pump until the consumption requirements in the delivery line are met.

It will thus be seen that the present invention provides a simple construction for a pressure-regulated, variable displacement pump which does not require hollow passages in the yoke arms and in which a single telescoping connection serves both as a delivery conduit and as a pressure-responsive, pump displacement regulator.

While the form of embodiment of the invention as herein disclosed constitutes a preferred form, it is to be understood that other forms might be adopted, all coming within the scope of the claims which follow.

What is claimed is as follows:

1. A variable displacement pump of the multiple axial cylinder type comprising in combination a housing, a drive shaft journalled in the housing, a yoke pivotally mounted in the housing to swing on an axis perpendicular to the drive shaft, a rotatable cylinder barrel carried by the yoke at a variable inclination to the drive shaft, pistons slidable in the cylinder barrel means for reciprocating the pistons by rotation of the drive shaft, distributing valve means associated with the yoke and having an inlet passage and an outlet passage cooperating with the cylinder barrel, a hollow pintle rigidly secured to the yoke at a distance from the pivotal axis thereof and having its interior communicating with the outlet passage, a pair of telescoping sleeve members, one mounted on the housing and the other pivotally connected to the pintle and resilient means biasing said members to one extreme position whereby the fluid pressure within said telescoping members may oppose the resilient means to control the position of the yoke and the displacement of the pump.

2. A variable displacement pump of the multiple axial cylinder type comprising in combination a housing, a drive shaft journalled in the housing, a yoke pivotally mounted in the housing to swing on an axis perpendicular to the drive shaft, a rotatable cylinder barrel carried by the yoke at a variable inclination to the drive shaft, pistons slidable in the cylinder barrel means for reciprocating the pistons by rotation of the drive shaft, distributing valve means associated with the yoke and having an inlet passage and an outlet passage cooperating with the cylinder barrel, a telescoping and swivelling hollow connection between the yoke and the housing providing a fluid passage from the outlet passage to the exterior of the housing and means incorporated in said connection responsive to outlet pressure for regulating the pump displacement.

3. A variable displacement pump of the type having coacting expansible chamber members rotatable about axes intersecting each other at a variable inclination, comprising in combination a housing journalling one of the members, a yoke pivoted in the housing and journalling the other member, inlet and outlet passages formed in the yoke, a telescoping and swivelling hollow connection between the yoke and the housing providing a fluid passage from the outlet passage to the exterior of the housing and means incorporated in said connection responsive to outlet pressure for regulating the pump displacement.

4. A variable displacement pump of the type having coacting expansible chamber members rotatable about axes intersecting each other at a variable inclination, comprising in combination a housing journalling one of the members, a yoke pivoted in the housing and journalling the other member, inlet and outlet passages formed in the yoke, a hollow pintle rigidly secured to the yoke at a distance from the pivoted axis thereof and having its interior communicating with the outlet passage, a pair of telescoping sleeve members, one mounted on the housing and the other pivotally connected to the pintle and resilient means biasing said members to one extreme position whereby the fluid pressure within said telescoping members may oppose the resident means to control the position of the yoke and the displacement of the pump.

5. A variable displacement pump of the type having coacting expansible chamber members rotatable about axes intersecting each other at a variable inclination, comprising in combination a housing journalling one of the members, a yoke pivoted in the housing and journalling the other member, inlet and outlet passages formed in the yoke, a telescoping and swivelling hollow connection between the yoke and the housing providing a fluid passage from the outlet passage to the exterior of the housing, said connection including a stationary cylinder secured to the housing, a piston slidable in the cylinder, a hollow rod articulated to the piston and pivotally mounted to the yoke and a spring biasing the piston against the pressure of the cylinder.

6. A variable displacement pump of the type having coacting expansible chamber members rotatable about axes intersecting each other at a variable inclination, comprising in combination a housing journalling one of the members, a yoke pivoted in the housing and journalling the other member, inlet and outlet passages formed in the yoke, a telescoping and swivelling hollow connection between the yoke and the housing providing a fluid passage from the outlet passage to the exterior of the housing, said connection including a stationary cylinder secured to the housing parallel to but offset from the axis of said one member, a piston slidable in the cylinder, a hollow rod articulated to the piston and pivotally mounted to the yoke and a spring biasing the piston against the pressure in the cylinder.

7. A variable displacement pump of the type having coacting expansible chamber members rotatable about axes intersecting each other at a variable inclination, comprising in combination a housing journalling one of the members, a yoke pivoted in the housing and journalling the other member, inlet and outlet passages formed in the yoke, a telescoping and swivelling hollow connection between the yoke and the housing providing a fluid passage from the outlet passage to the exterior of the housing, said connection including a stationary cylinder secured to the housing, a piston slidable in the cylinder, a hollow rod projecting through the piston at one end and pivotally mounted to the yoke at its other end, a retainer ring secured to the rod at the end projecting through the piston said ring and piston having mating spherical surfaces and a spring abutting the opposite end of the piston to hold the piston in contact with the ring and to oppose the fluid pressure in the cylinder.

8. A variable displacement pump of the type having coacting expansible chamber members rotatable about axes intersecting each other at a variable inclination, comprising in combination a housing journalling one of the members, a yoke pivoted in the housing and journalling the other member, inlet and outlet passages formed in the yoke, a telescoping and swivelling hollow connection between the yoke and the housing providing a fluid passage from the outlet passage to the exterior of the housing, said connection including a stationary cylinder secured to the housing, a piston slidable in the cylinder, a hollow rod projecting through the piston at one end and pivotally mounted to the yoke at its other end, a retainer ring secured to the rod at the end projecting through the piston, said ring and piston having mating spherical surfaces and a spring abutting the opposite end of the piston to hold the piston in contact with the ring and to oppose the fluid pressure in the cylinder, said cylinder being removably mounted on the housing without disturbing the piston, rod and spring assembly.

JAMES ROBINSON.

REFERENCES CITED

The following references are of record in the file of this patent:

UNITED STATES PATENTS

| Number | Name | Date |
|---|---|---|
| 2,146,133 | Tweedale | Feb. 7, 1939 |
| 2,155,455 | Thoma | Apr. 25, 1939 |
| 2,284,897 | Harrington | June 2, 1942 |
| 2,382,437 | Molly | Aug. 14, 1945 |

OTHER REFERENCES

Ser. No. 249,805, Molly (A. P. C.), published May 11, 1943.

Ser. No. 352,146, Molly (A. P. C.), published May 11, 1943.